United States Patent [19]

Wagner et al.

[11] 4,456,542

[45] Jun. 26, 1984

[54] METHOD FOR IMPARTING HYDROPHOBIC PROPERTIES TO FIBERS

[75] Inventors: Wolfgang Wagner, Tokyo, Japan; Matthias Scherer, Emmerting, Fed. Rep. of Germany; Karl-Heinrich Wegehaupt; Volker Frey, both of Burghausen, Fed. Rep. of Germany

[73] Assignee: Wacker Chemie GmbH, Munich, Fed. Rep. of Germany

[21] Appl. No.: 469,850

[22] Filed: Feb. 25, 1983

Related U.S. Application Data

[63] Continuation of Ser. No. 295,889, Aug. 24, 1981, abandoned.

[30] Foreign Application Priority Data

Oct. 29, 1980 [DE] Fed. Rep. of Germany ....... 3040758

[51] Int. Cl.$^3$ ............................................ D06M 15/66
[52] U.S. Cl. ...................................... 252/8.6; 427/387; 427/316; 427/389.7; 427/389.8; 427/389.9; 427/392; 427/393.4; 427/393.6
[58] Field of Search .................. 427/389.9, 316, 393.6, 427/393.4, 387, 389.8, 392, 389.7; 252/8.6; 528/15, 20, 29, 42

[56] References Cited

U.S. PATENT DOCUMENTS

| | | | |
|---|---|---|---|
| 2,588,365 | 3/1952 | Dennett | 427/387 |
| 3,383,356 | 5/1968 | Nielsen | 528/15 |
| 3,445,420 | 5/1969 | Kookootsedes et al. | 528/15 X |
| 3,983,298 | 9/1976 | Hahn et al. | 528/15 X |
| 3,989,668 | 11/1976 | Lee et al. | 528/15 X |
| 4,248,751 | 2/1981 | Willing | 528/15 X |

*Primary Examiner*—Thurman K. Page

[57] ABSTRACT

Hydrophobic fibers are prepared by treating fibers with a composition containing an organopolysiloxane having Si-bonded hydrogen atoms as essentially its only reactive group, and a platinum catalyst which is inhibited by a compound which is volatile under the conditions at which the organopolysiloxane containing Si-bonded hydrogen atoms is deposited on the fiber.

3 Claims, No Drawings

METHOD FOR IMPARTING HYDROPHOBIC PROPERTIES TO FIBERS

This is a continuation, of application Ser. No. 295,889, filed Aug. 24, 1981 now abandoned.

The present invention relates to fibers having hydrophobic properties and more particularly to a method for treating fibers to impart hydrophobic properties thereto.

BACKGROUND OF THE INVENTION

Fibers have been treated heretofore with siloxanes to impart hydrophobic properties thereto. For example, U.S. Pat. No. 2,588,365 to Dennett describes a method for imparting hydrophobic properties to fibers by treating the fibers with a mixture consisting of from 20 to 70 percent by weight of methylpolysiloxanes and from 80 to 30 percent by weight of organopolysiloxanes containing Si-bonded hydrogen and a catalyst which is capable of splitting off hydrogen from the Si-bonded hydrogen groups.

Catalysts which have been used heretofore with organopolysiloxanes containing Si-bonded hydrogen to coat fibers to impart hydrophobic properties thereto have a tendency to split off hydrogen at temperatures below those normally employed to treat fibers, and cause premature gelling of the organopolysiloxane employed in the hydrophobic treatment. Thus, one of the advantages of this invention is that the catalyst does not cleave the silicon-hydrogen bond at temperatures below those generally employed in treating fibers, thereby avoiding premature gellation of the organopolysiloxanes used to treat fibers to render them hydrophobic.

Therefore, it is an object of this invention to provide fibers having hydrophobic properties. Another object of this invention is to provide a method for treating fibers to impart hydrophobic properties thereto. A further object of this invention is to provide a composition, which is stable at temperatures below those employed to treat fibers, but when applied to fibers will render them hydrophobic.

SUMMARY OF THE INVENTION

The foregoing objects and others which will become apparent from the following description are accomplished in accordance with this invention, generally speaking, by providing a method for rendering fibers hydrophobic which comprises treating the fibers with a composition containing an organopolysiloxane having Si-bonded hydrogen groups as the essentially only reactive groups, a platinum catalyst and a compound which inhibits the platinum catalyst, but is volatile under the conditions at which the organopolysiloxane containing Si-bonded hydrogen groups is applied to the fibers.

The method of this invention may be used to treat organic fibers such as polyamide fibers or cotton, inorganic fibers such as asbestos, asbestos foams and glass fibers, and in particular glass fibers which are used for thermal insulation to render them hydrophobic.

DETAILED DESCRIPTION OF THE INVENTION

Any organopolysiloxane containing essentially only Si-bonded hydrogen as its only reactive constituent and which could have been used heretofore in rendering fibers hydrophobic may be used in the process of this invention. These organopolysiloxanes generally contain units of the formula $$R_nH_mSiO_{4-m-n'/2}$$

where R represents the same or different alkyl or aryl radicals having from 1 to 6 carbon atoms, n is 0, 1, 2 or 3, and on the average range between 0.9 to 1.8, and m is 0 or 1, and on the average range between 0.1 and 1.0.

Examples of radicals represented by R in the above formula are the methyl, ethyl and phenyl radical. It is preferred that at least 80 percent of the number of R radicals be methyl radicals.

The term "organopolysiloxane containing essentially only Si-bonded hydrogen as its only reactive constituent" is intended to mean that in the organopolysiloxane or any other organosilicon compounds being used, at least 50 gram atoms of Si-bonded hydrogen are present for each gram molecule of groups such as Si-bonded OH or vinyl groups which are capable of reacting with Si-bonded hydrogen.

In the process of this invention it is possible to use any platinum catalysts which have been or could have been used heretofore in the addition of Si-bonded hydrogen to an aliphatic multiple bond. Examples of such platinum catalysts are metallic and finely dispersed platinum which may be present on carriers such as silicon dioxide or aluminum oxide, and compounds or complexes of platinum such as $PtCl_4$, $PtCl_6 \cdot 6H_2O$, $Na_2PtCl_4 \cdot 4H_2O$, platinum-olefin complexes, platinum-vinylsiloxane complexes, especially platinum divinyltetramethyldisiloxane complexes containing or are free of a detectable amount of halogen, bis-(gamma-picolin)-platinum dichloride and trimethylenedipyridine-platinum dichloride.

The platinum catalyst is preferably employed in an amount of from 0.002 to 0.008 percent by weight, based on elemental platinum per gram-atom of Si-bonded hydrogen.

Examples of preferred compounds which are volatile under the conditions for depositing the Si-bonded hydrogen containing organopolysiloxanes on fibers, are acetylene alcohols which boil at temperatures below 160° C. at atmospheric pressure. An example of a preferred acetylene alcohol is 2-methyl-3-butine-2-ol, which could also be described as 3-methyl-1-butine-3-ol. Additional examples of suitable inhibitors are halogenated hydrocarbons having 1 or 2 carbon atoms, such as trichloroethylene and 1,2-difluoro-1,1,2,2-tetrachloroethylene.

It is preferred that the inhibiting compounds which are volatile under the conditions employed in depositing the Si-bonded hydrogen containing organopolysiloxane on the fiber, be employed in an amount of from 1 kg to 100 kg per gram atom of platinum in the platinum catalyst.

In addition to the organopolysiloxane containing Si-bonded hydrogen, as essentially the sole reactive constituent, platinum catalyst and inhibitor, it is possible to employ other substances in the process of this invention, except for organosilicon compounds containing groups which are capable of reacting with Si-bonded hydrogen. It is preferred that the additional substances be organic solvents.

The mixture containing the organopolysiloxane having Si-bonded hydrogen as its essentially only reactive constituent, platinum catalyst, inhibitor and other substances, if desired, may be applied to fibers to render them hydrophobic by any method which is generally used to saturate or impregnate fibers, such as, for example immersion, spraying, calendering or coating.

The Si-bonded hydrogen contaning organopolysiloxane is preferably deposited on the fiber over a period of from 3 to 10 minutes, at 0.5 to 1.2 bar and at a temperature between 100° and 170° C.

The following example shows that a platinum catalyst which is inhibited for example with 2-methyl-3-butine-2-ol may be used for crosslinking an organopolysiloxane containing only Si-bonded hydrogen atoms as the reactive groups. These organopolysiloxanes are equally suitable for treating fibers, for example, asbestos, to render them hydrophobic.

EXAMPLE

About 5 ml of 2-methyl-3-butine-2-ol and a solution containing 17 mg of $PtCl_4$ in 1 ml of octane was added to 95 ml of toluene. About 50 microliters of the resultant toluene solution was then incorporated in 20 gm of a compound having the general formula $(CH_3)_3SiO(SiHCH_3-O)_xSi(CH_3)_3$, where x has an average number of 28. The resultant mixture was heated for 5 minutes to 160° C., then extracted at room temperature with 100 ml of acetone. The extraction was again repeated with 100 ml of acetone. A residue of 18 gm of an insoluble polymer was recovered.

COMPARISON EXAMPLE

The procedure deascribed in the preceding example was repeated, except that the toluene solution containing the platinum catalyst and inhibitor was omitted. Following extraction with acetone, only 2.4 gm of an insoluble polymer was recovered.

What is claimed is:

1. A method of treating fibers with an organopolysiloxane to impart hydrophobic properties thereto which comprises applying to the fibers at a temperature of from 100° to 170° C. a composition consisting essentially of an organopolysiloxane having units of the formula $R_nH_mSiO_{4-m-n/2}$ Where R is selected from the group consisting of alkyl and aryl radicals having from 1 to 6 carbon atoms, n is 0, 1, 2 or 3, with an average of from 0.9 to 1.8, m is 0 or 1, with an average of from 0.1 to 1.0, in which the only reactive group on the organopolysiloxane is Si-bonded hydrogen atoms and at least 50 gram atoms of Si-bonded hydrogen are present per gram molecule of groups which are capable of reacting with the Si-bonded hydrogen, a platinum catalyst and a compound which inhibits the platinum catalyst and is volatile under the conditions at which the organopolysiloxane containing the Si-bonded hydrogen atoms is deposited on the fiber.

2. The method of claim 1, wherein the compound which inhibits the platinum catalyst is 2-methyl-3-butine-2-ol.

3. The method of claim 1, wherein the compound is volatile at a temperature below 160° C. at atmospheric pressure.

* * * * *